United States Patent
Ishiguro et al.

[11] Patent Number: 5,917,910
[45] Date of Patent: Jun. 29, 1999

[54] ENCRYPTING METHOD AND APPARATUS, RECORDING METHOD, DECRYPTING METHOD AND APPARATUS, AND RECORDING MEDIUM

[75] Inventors: Ryuji Ishiguro; Masafumi Minami, both of Tokyo, Japan

[73] Assignee: Sony Corporation, Tokyo, Japan

[21] Appl. No.: 08/721,310

[22] Filed: Oct. 15, 1996

[30] Foreign Application Priority Data

Oct. 16, 1995 [JP] Japan .................................. 7-267252

[51] Int. Cl.$^6$ ........................................... H04L 9/00
[52] U.S. Cl. .................... 380/4; 380/44; 380/5; 380/46
[58] Field of Search ................... 380/3, 4, 5, 9, 380/21, 49, 44, 46

[56] References Cited

U.S. PATENT DOCUMENTS

| | | | |
|---|---|---|---|
| 5,148,422 | 9/1992 | Sako et al. | 369/44.26 |
| 5,327,563 | 7/1994 | Singh | 380/4 |
| 5,412,718 | 5/1995 | Narasimhalu et al | 380/4 |
| 5,416,840 | 5/1995 | Cane et al. | 380/4 |
| 5,467,398 | 11/1995 | Pierce et al. | 380/44 |
| 5,538,773 | 7/1996 | Kondo | 428/64.1 |
| 5,563,947 | 10/1996 | Kikinis | 380/4 |
| 5,572,507 | 11/1996 | Ozaki et al. | 369/275.4 |
| 5,590,200 | 12/1996 | Nachman et al. | 380/46 |
| 5,694,469 | 12/1997 | Le Rue | 380/4 |

*Primary Examiner*—Bernarr E. Gregory
*Assistant Examiner*—Pinchus M. Laufer
*Attorney, Agent, or Firm*—Frommer Lawrence & Haug, LLP.; William S. Frommer

[57] ABSTRACT

When information to be recorded is encrypted by using an encryption key, an encryption key based on inherent information inherent in a recording medium is generated. The information to be recorded on the recording medium is encrypted based on the encryption key. The inherent information inherent in the recording medium is a specific information on a disk. When an encrypted information recorded on a recording medium is decrypted, there are reproduced from a recording medium a first file storing information encrypted by using an encryption key generated based on a random data to be inserted into a predetermined portion of the encrypted information to be recorded on a recording medium and a second file storing data indicative of a predetermined portion of the random data to be inserted into a predetermined portion of the encrypted information. The random data is detected from the encrypted information stored the reproduced first file based on the data stored in the reproduced second file and indicating the predetermined portion of the random data. A decryption key is generated from the detected random data. The encrypted information of the reproduced first file is decrypted by using the decryption key.

19 Claims, 14 Drawing Sheets

F I G. 9
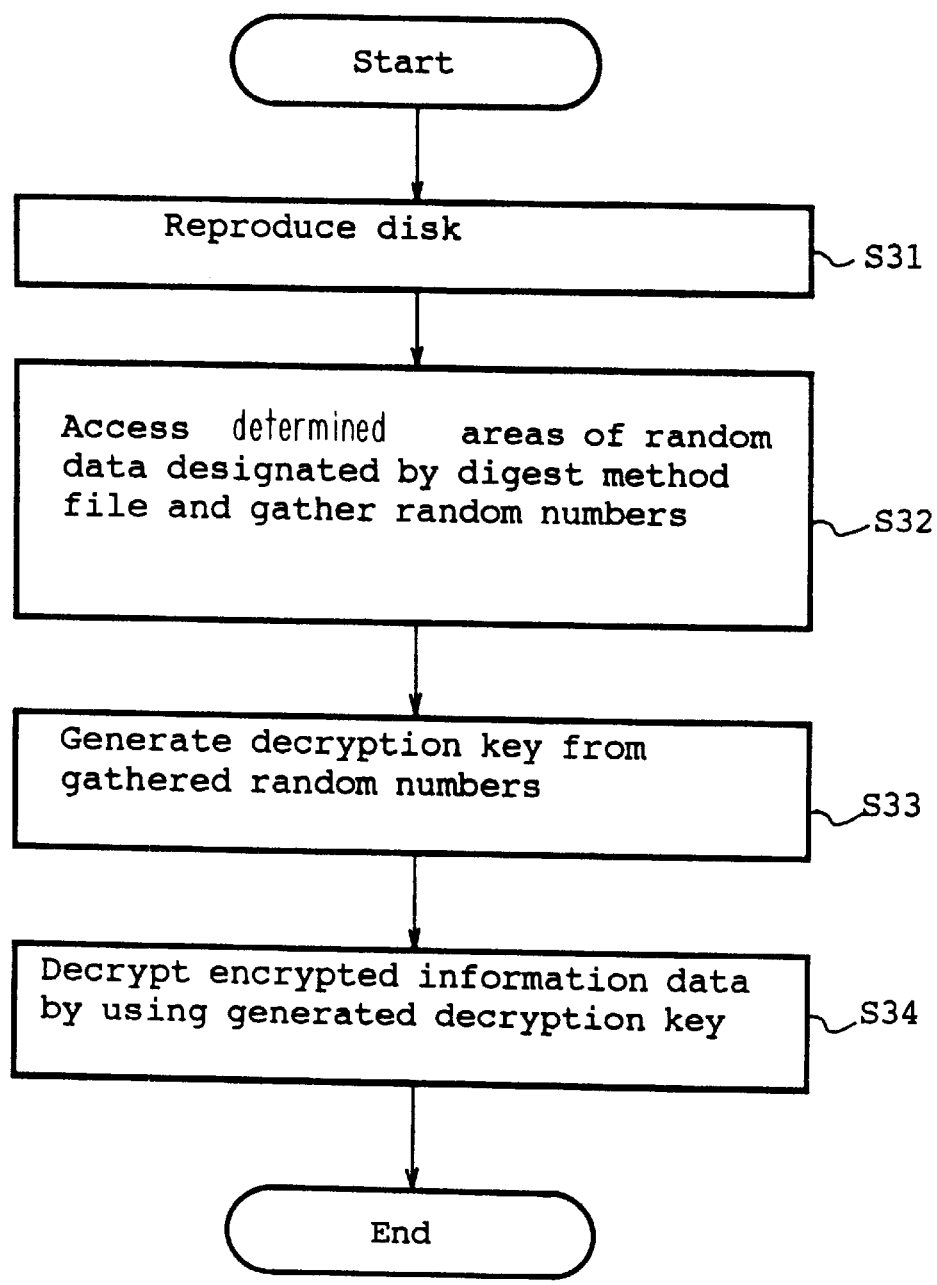

Information inherent in disk which is recorded on surface of substrate

ENCRYPTING METHOD AND APPARATUS, RECORDING METHOD, DECRYPTING METHOD AND APPARATUS, AND RECORDING MEDIUM

BACKGROUND OF THE INVENTION

1. Field of the Invention

The present invention relates to encrypting method and apparatus, decrypting method and apparatus, and a recording medium in which information encrypted by an encrypting method or an encrypting apparatus is recorded, and, for example, encrypting method and apparatus, decrypting method and apparatus, and a recording medium suitable for use in a system in which information such as video signals, audio signals, data signals or the like is encrypted, the encrypted information is recorded on a recording medium, and the encrypted information is decrypted.

2. Description of the Related Art

When information is encrypted and then recorded on a predetermined recording medium, information is encrypted by using a predetermined encryption key and the encrypted information is recorded on the recording medium. The encrypted information is decrypted by using a decryption key for decrypting the encrypted information recorded on the recording medium.

A cryptosystem employing a key (an encryption key) includes two cryptosystems; a common-key cryptographic scheme and a public-key cryptosystem. In the common-key cryptosystem, a key (encryption key) used upon encryption is the same as a key (decryption key) used upon decryption. For example, of the common-key cryptosystems, a data encryption standard (DES) system is frequently employed. On the other hand, in the public-key cryptosystem, an encryption key and a decryption key are different from each other. In this public-key cryptosystem, the encryption key is opened to the public, but the decryption key is kept secret. In general, such encryption method and decryption method are known.

An encryption method is disclosed in Japanese patent publication No. 60007/1990. According to the method, an encryption key is generated based on a data forming a file to be recorded on a recording medium. Information is encrypted by using the encryption key, and the encrypted information is recorded on the recording medium. The file is reproduced from the recording medium, and a decryption key is generated based on data forming the file. Then, the encrypted information is decrypted by using the generated decryption key.

However, when such encryption method and decryption method are employed, the file used for generating the encryption key is recorded on one portion (sequent regions) of the recording medium, which may allow the file to be duplicated with comparative ease.

SUMMARY OF THE INVENTION

In view of such aspect, it is an object of the present invention to provide encrypting method and apparatus, a recording method, and decryption method and apparatus which allows strong copy protect to be effected on the information recorded on a recording medium, and a recording medium where information encrypted by the encrypting apparatus is recorded.

According to a first aspect of the present invention, when information to be recorded is encrypted by using an encryption key, an encryption key based on inherent information inherent in a recording medium is generated. The information to be recorded on the recording medium is encrypted based on the encryption key. The inherent information inherent in the recording medium is a specific information on a disk.

According to a second aspect of the present invention, an encrypting apparatus for encrypting information to be recorded by using an encryption key includes a means for generating an encryption key based on inherent information inherent in a recording medium, and a means for encrypting the information to be recorded on the recording medium based on the encryption key. The inherent information inherent in the recording medium is a specific information on a disk.

According to a third aspect of the present invention, when information obtained by encrypting information to be recorded by using an encryption key is recorded on a recording medium, an encrypted information is received based on an encryption key generated based on inherent information inherent in a recording medium. The received encrypted information is recorded on a recording medium. The inherent information inherent in the recording medium is a specific information on a disk.

According to a fourth aspect of the present invention, when an encrypted information recorded on a recording medium is decrypted, there are reproduced from a recording medium a first file storing information encrypted by using an encryption key generated based on a random data to be inserted into a predetermined portion of the encrypted information to be recorded on a recording medium and a second file storing data indicative of a predetermined portion of the random data to be inserted into a predetermined portion of the encrypted information. The random data is detected from the encrypted information stored in the reproduced first file based on the data stored in the reproduced second file and indicating the predetermined portion of the random data. A decryption key is generated from the detected random data. The encrypted information of the reproduced first file is decrypted by using the decryption key.

According to a fifth aspect of the present invention, a decrypting apparatus for decrypting an encrypted information recorded on a recording medium includes a means for reproducing from the recording medium a first file storing information encrypted by using an encryption key generated based on a random data to be inserted into a predetermined portion of the encrypted information to be recorded on a recording medium and a second file storing data indicative of a predetermined portion of the random data to be inserted into a predetermined portion of the encrypted information, a means for detecting the random data from the encrypted information stored in the reproduced first file based on the data stored in the reproduced second file and indicating the predetermined portion of the random data, a means for generating a decryption key from the detected random data, and a means for decrypting the encrypted information of the reproduced first file by using the decryption key.

According to a sixth aspect of the present invention, a recording medium capable of being used in decryption by a decrypting apparatus includes a recorded signal capable of being decrypted by a decrypting apparatus,. The recorded signal includes a first file storing information encrypted by using an encryption key generated based on random data to be inserted into a predetermined portion of an encrypted information.

BRIEF DESCRIPTION OF THE DRAWINGS

FIG. 9 is a flowchart used to explain a decrypting operation of a decrypting apparatus according to the second embodiment of the present invention;

DESCRIPTION OF THE PREFERRED EMBODIMENTS

An embodiment of the present invention will hereinafter be described with reference to the accompanying drawings. Informations used in this embodiment are video informations, audio informations, text informations and so on. In this embodiment, recording media on which encrypted information to be decrypted is recorded are, for example, disk-like recording media such as digital video disks (DVD), optical disks, magneto-optical disks, magnetic disks such as flexible disks or hard disks, and so on, and tape-like recording media such as magnetic tapes or the like.

These recording media are slave recording media a large number of which are produced by duplication of a master disk, a master magnetic tape or the like. Data (plain text) to be encrypted is data subjected to the scrambling, the shuffling, the encoding according to moving picture experts group (MPEG) system, the encoding according to joint photographic experts group (JPEG) system and so on. In accordance with the data to be encrypted, data (plain text) decrypted from encrypted data is data to be subjected to the de-scrambling, the de-shuffling, the decoding according to the MPEG system, the decoding according to the JPEG system and so on.

Figure 1:
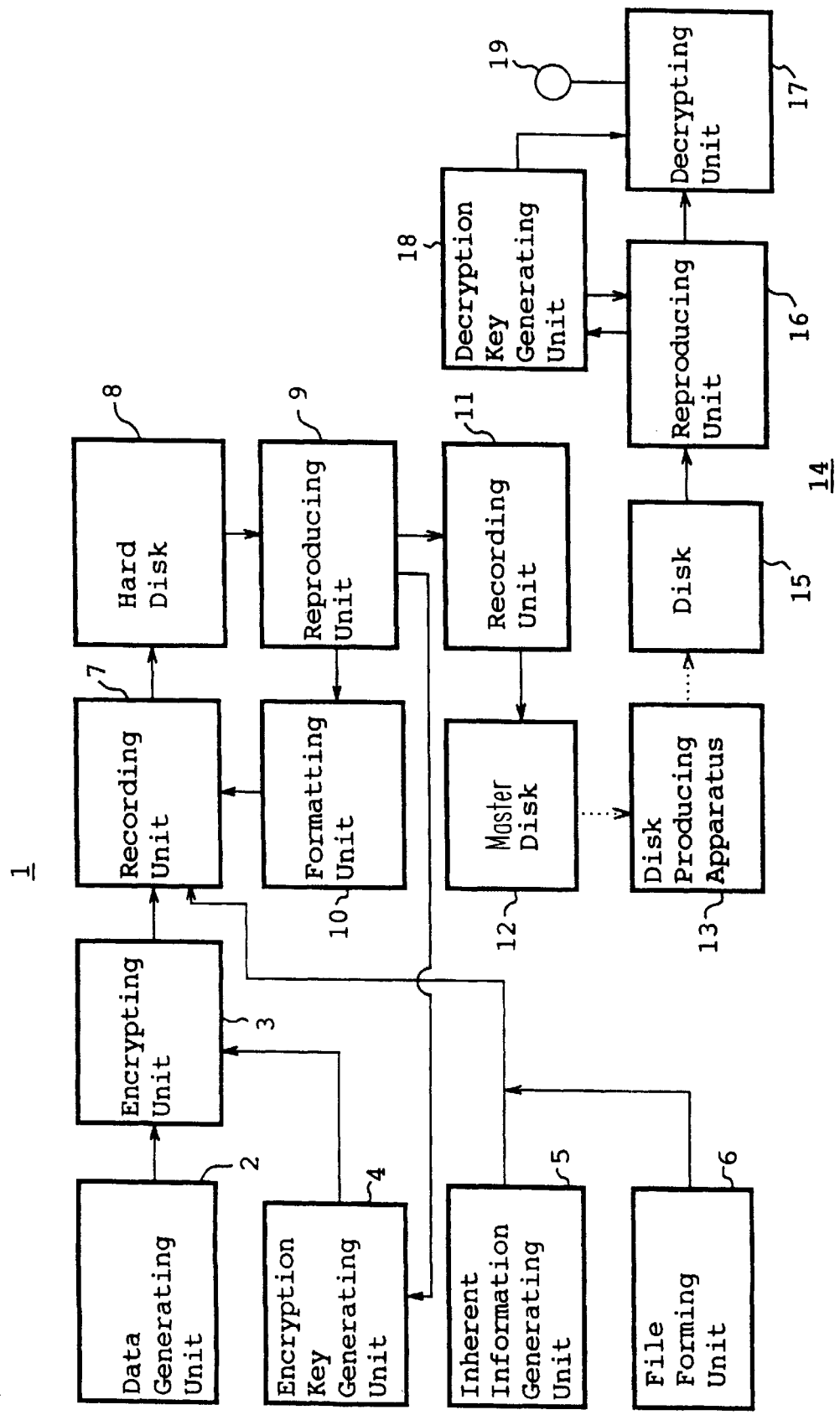
FIG. 1 is a block diagram showing an arrangement of an encrypting apparatus and a decrypting apparatus according to a first embodiment of the present invention.

FIG. 1 is a block diagram showing an arrangement of an encrypting apparatus and a decrypting apparatus according to the first embodiment of the present invention, by way of example.

An encrypting apparatus 1 includes an information data generating unit 2 which is formed of a reproducing apparatus for reproducing an information data (such as digital video information, digital audio information or the like) from a recording tape and so on on which the information data is recorded. THe data generating unit 2 outputs the reproduced information data (plain text) to an encrypting unit 3. The encrypting unit 3 encrypts the information data output from the information data generating unit 2 and outputs an encrypted information data (cryptogram) to a recording unit 7 which will be described later on.

Figure 2:
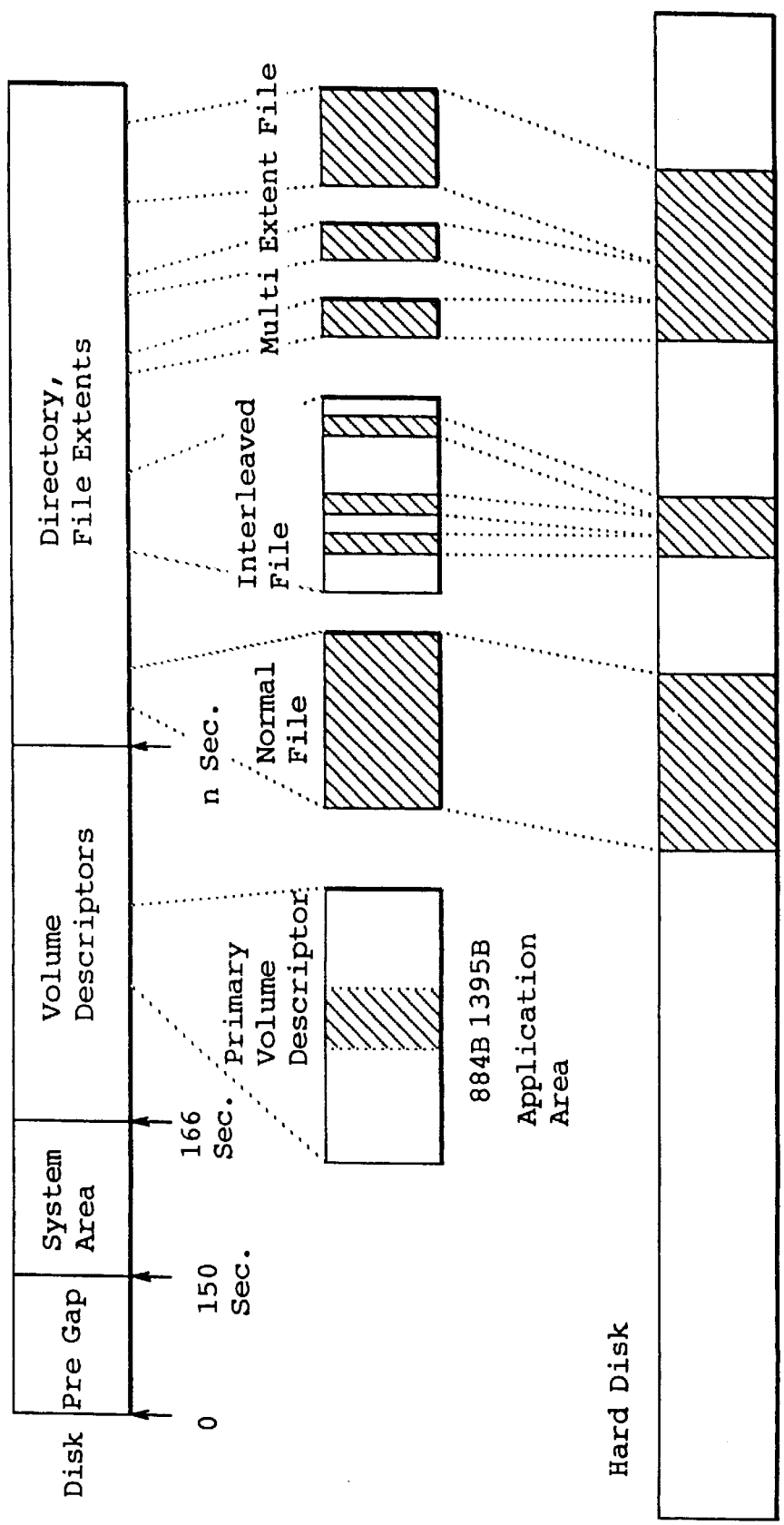
FIG. 2 is a diagram showing a logical file format according to ISO9660 standard.

The encrypting apparatus also includes an inherent information generating unit 5 which outputs information inherent in a recording medium to the recording unit 7. A random data (random number data) or the like is employed as the information inherent in the recording medium. The random data is recorded by the recording unit 7 on a predetermined region of the recording medium such as a disk or the like as a normal file as shown in FIG. 2. Indeed, since the random data is the normal file, the random data can be copied. But, when this file is copied to the recording medium such as a hard disk or the like, as shown in FIG. 2, a position (allocation) of this file is changed, which prevents the same information as that of an original disk from being obtained.

FIG. 2 is a diagram showing a logical file format according to the ISO9660 standard. As shown in FIG. 2, sectors 0 to 149 are set as a pre gap area where data may or may not be recorded. Sectors 150 to 165 are set as a system area where a copyright information is stored, for example. Subsequent sectors 166 to n–1 (were n is a variable number and a predetermined integer value) are set as volume descriptors where management informations are stored.

The volume descriptors include a primary volume descriptor where a table of directories (path table) and so on are stored. Sector n and succeeding sectors are user-accessible areas where predetermined files are stored. Each of the sectors is formed of 2 kbytes, and an offset is used to indicate a position therein.

As shown in FIG. 2, for example, the random data can be recorded as an interleaved file. Moreover, the random data can be recorded as a multi extent file. The interleaved file is a file of the random data recorded on a plurality of discontinuous portions in a predetermined area. The multi extent file is a file of the random data which are recorded on a plurality of discontinuous areas as one file.

When the random data is recorded as the interleaved file or the multi extent file, the random data can be recorded on dispersed positions, which makes it more difficult to match the position of the random data recorded on the read-only disk with the position of the random data obtained by copying the random data from the read-only disk.

Moreover, it is possible to record the random data on the pre gap area (00:00:00:00 to 00:00:02:00) or on the system area (00:00:02:00 to 00:00:02:16) according to the ISO9660 standard. When the random data is recorded on either of the above areas, the recorded random data cannot be accessed as the normal file, which makes it difficult to copy the random data.

Moreover, it is possible to record the random data on an application area with its offset within the range from 884th byte to 1395th byte of the primary volume descriptor of the volume descriptor according to the ISO9660 standard. Since this application area stores a header information of the files according to the ISO9660 standard, the random data recorded on the area cannot be accessed as the normal file, which makes it difficult to copy the random data stored therein.

The random data is finally recorded on a master disk 12 as shown in FIG. 1.

The encrypting apparatus 1 includes a file forming unit 6 for forming a file (digest method file) indicative of a predetermined portion of an encrypted information data. Specifically, the file forming unit 6 designates the random data from a predetermined byte number to another predetermined byte number in the same sector or over different sectors of the random data recorded on the master disk 12 with being inserted in the above encrypted information data. Then, the file forming unit 6 forms a file (digest method file) formed of one or plural pairs of sector numbers and offsets (byte number in a sector). The file indicative of a predetermined portion of the information data (the digest method file) is inserted into an predetermined area in the encrypted information data and finally recorded on the master disk 12.

The encrypting apparatus 1 includes the recording unit 7 for recording on a hard disk 8 the random data supplied from the inherent information generating unit 5, the digest method file supplied from the file forming unit 6, and the encrypted information data supplied from the encrypting unit 3. The encrypting apparatus 1 includes a reproducing unit 9 formed of a magnetic head, an amplifier and so on. The reproducing unit 9 reads out the random data from the hard disk 8 based on the digest method file recorded on the hard disk 8 and supplies the read random data to the encryption key generating unit 4. The reproducing unit 9 also reads out the encrypted information data and supplies the encrypted information data together with the random data and the digest method file to a formatting unit 10.

The formatting unit 10 formats the encrypted information data and the digest method file supplied from the reproducing unit 9 to produce a pre-master image. The formatting unit 10 supplies the pre-master image to the recording unit 7. At this time, as described above, the formatting unit 10 can format the random data as the normal file according to the ISO9660 standard, and, as described above, can format the data as the interleaved file or the multi extent file. The recording unit 7 records the pre-master image on the hard disk 8. The encrypting apparatus 1 includes a recording unit 11 formed of an optical head, an amplifier and so on. The recording unit 11 records the pre-master image reproduced from the hard disk 8 by the reproducing unit 9 on the master disk 12. A disk producing apparatus 13 employs the master disk 12 as an original disk to reproduce a large number od disks 15 (slave disks).

A decrypting apparatus 14 includes a reproducing unit 16, a decrypting unit 17, a decryption-key generating unit 18, and an output terminal 19. The reproducing unit 16 reproduces the disk 15. The decryption-key generating unit 18 generates a decryption key based on a reproduced signal supplied from the reproducing unit 16, and outputs the decryption key to the decrypting unit 17 which will be described later on. The decrypting unit 17 decrypts the reproduced signal supplied from the reproducing unit 16 based on the decryption key supplied from the decryption-key generating unit 18.

Figure 3:
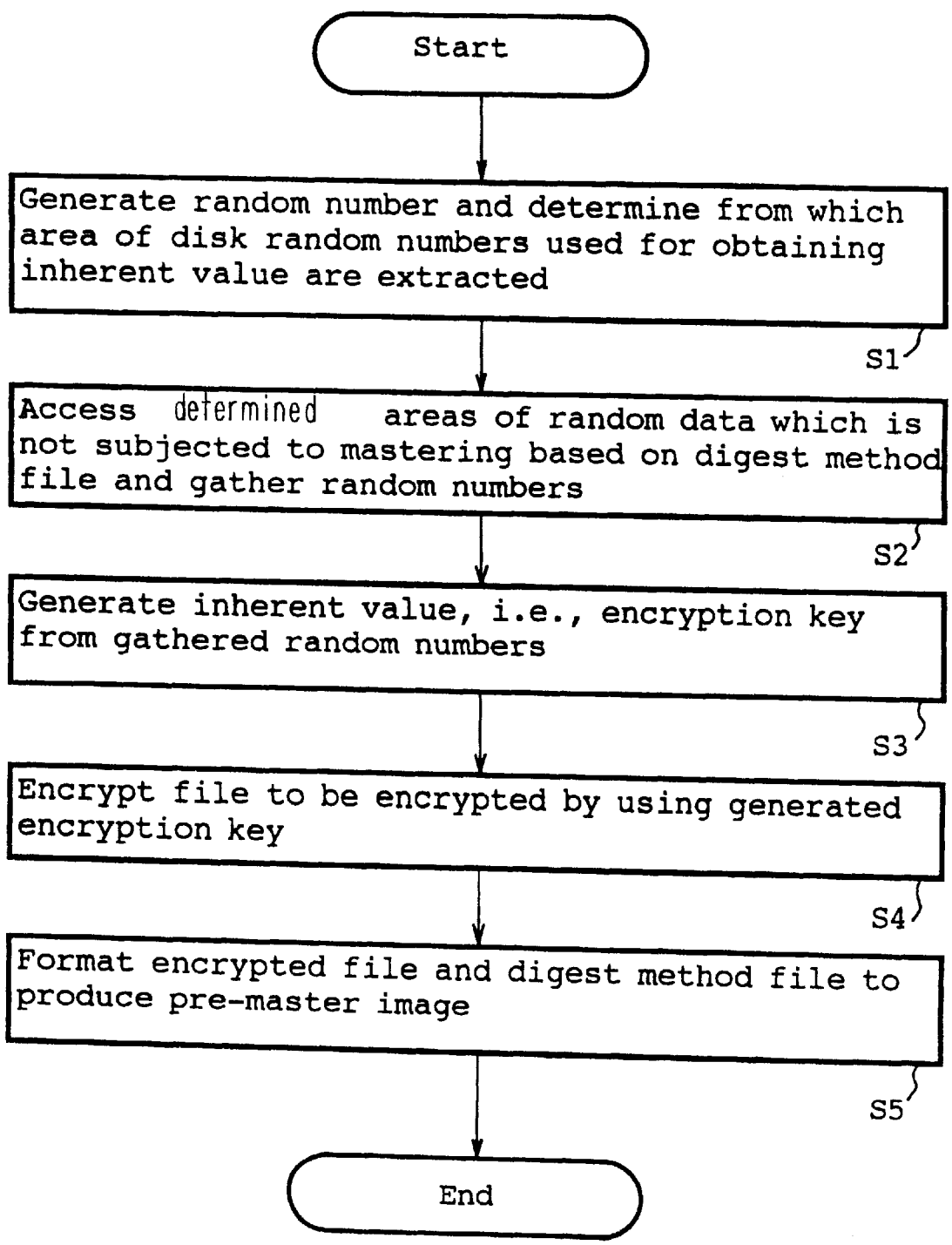
FIG. 3 is a flowchart used to explain an encrypting operation of an encrypting apparatus according to the first embodiment of the present invention.

An encrypting operation of the encrypting apparatus 1 will be described with reference to FIG. 3 which is a flowchart therefor. In step S1, initially, the inherent information generating unit 5 generates the random data (random-number data) which is a value (encryption key) inherent in a recording medium and supplies the random data to the recording unit 7. In this step, the file forming unit 6 determines from which area of the master disk 12 the random data (random-number data) used for the value (encryption key) inherent in the recording medium is extracted, and then produce a file (digest method file) indicative of one or a plurality of determined areas.

Figure 4:
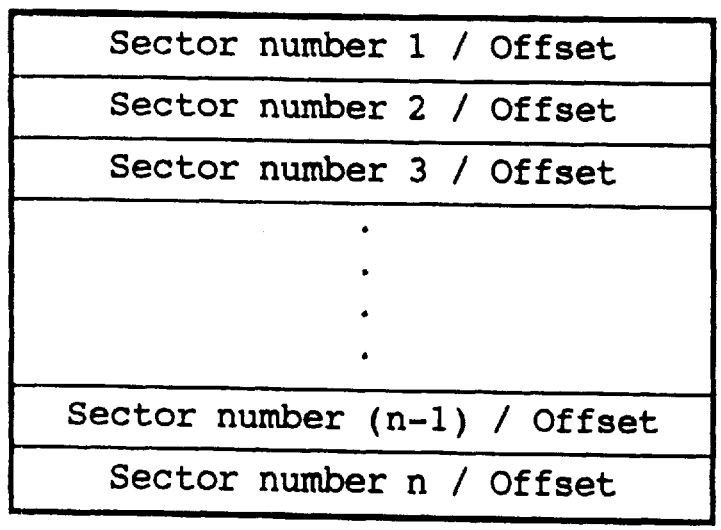
FIG. 4 is a table showing an example of an arrangement of a digest method file.
Figure 5:
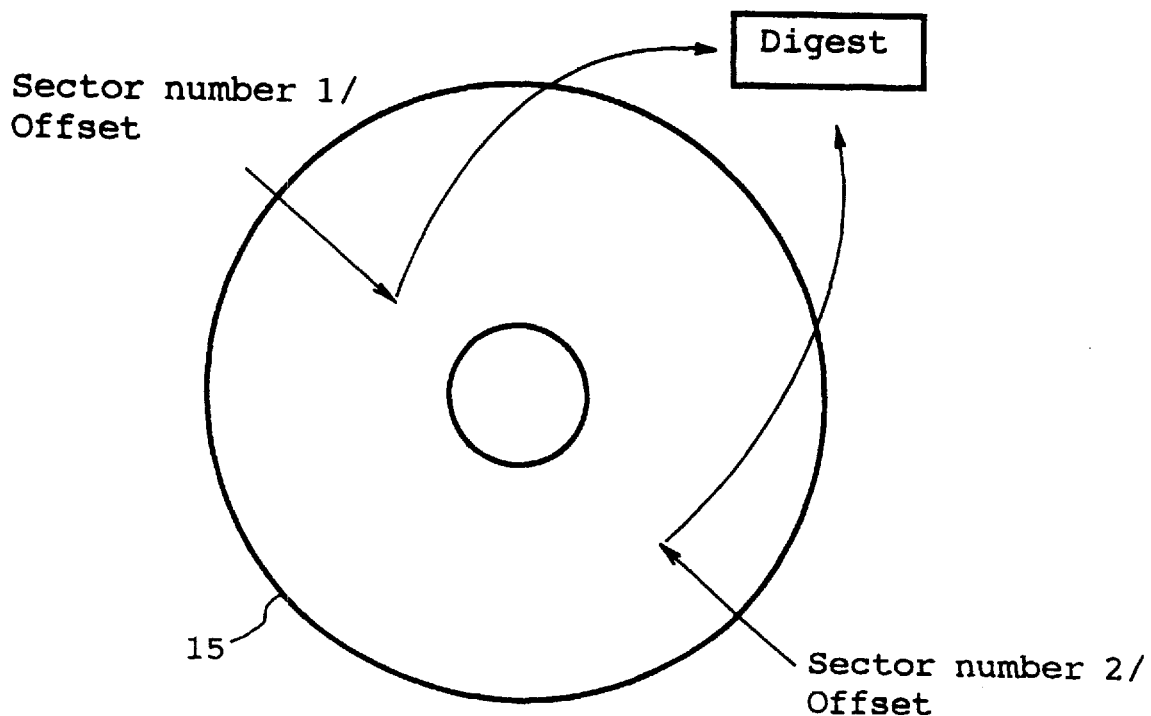
FIG. 5 is a diagram used to explain a method of producing a disk digest.

As shown in FIG. 4, for example, the digest method file is formed of a table including a large number of offsets (offset numbers) of n sectors from the sector number 1 to the sector number n (where n is the number of about several tens). As shown in FIG. 5, the table designates data from a predetermined offset in a sector of the sector number 1 to another predetermined offset therein and data from a predetermined offset in a sector of the sector number 2 to another predetermined offset therein. The digest method file is recorded by the recording unit 7 on the hard disk 8. The random data is also recorded by the recording unit 7 on the hard disk 8.

The processing proceeds to step S2. The reproducing unit 9 reproduces the random data of the digest method file, which is determined in step S1 and recorded on the hard disk 8, from the predetermined offset in the sector of the sector number 1 to another predetermined sector therein and from the predetermined offset in the sector of the sector number 2 to another predetermined offset therein. The reproducing unit 9 then gathers the reproduced random data. The reproducing apparatus 9 supplies these gathered random data to the encryption-key generating unit 4.

In step S3, the encryption-key generating unit 4 subjects the random data supplied from the reproducing unit 9 to a predetermined calculation (e.g., addition) or generates the encryption key (inherent value, disk digest) from the random data itself as shown in FIG. 5. Then, the processing proceeds to step S4. In step S4, the encryption-key generating unit 4 supplies the generated encryption key to the encrypting unit 3. The encrypting unit 3 encrypts the information data supplied from the information data generating unit 2 based on the supplied encryption key. The encrypting unit 3 supplies the encrypted information data to the recording unit 7. Then, the recording unit 7 records the encrypted information data on the hard disk 8.

Then, the processing proceeds to step S5. the reproducing unit 9 reproduces the encrypted information data, the random data which is to be the information inherent in the recording medium, and the digest method file indicative of the predetermined portion of the encrypted information data which are recorded on the hard disk 8, and supplies them to the formatting unit 10. The formatting unit 10 generates the pre-master image (format signal) from the encrypted information data, the random data which is to be the information inherent in the recording medium, and the digest file method file indicative of the predetermined portion of the encrypted information data all of that are supplied from the reproducing unit 9. At this time, as described above, the formatting unit 10 formats the random data as the normal file according to the ISO9660 standard. Moreover, the formatting unit 10 can format the random data as the interleaved file or the multi extent file to be dispersed.

The formatting unit 10 supplies the produced pre-master image to the recording unit 7. The recording unit 7 temporarily records the pre-master image on the hard disk 8. The reproducing unit 9 reproduces the pre-master image recorded on the hard disk 8 and supplies the reproduced data to the recording unit 11. The recording unit 11 records the reproduced data supplied from the reproducing unit 9 on the master disk 12. Alternatively, the formatting unit 10 can supply the pre-master image, i.e., the formatting signal directly to the recording unit 11 which records the pre-master image on the master disk 12.

The disk producing apparatus 13 employs the master disk thus produced as an original disk to reproduce a large number of the disks (slave disks such as a DVD, an optical disk, a magneto-optical disk, or the like) 15. When the magnetic tape is employed as the recording medium, a transfer apparatus may be employed to transfer signals recorded on the master magnetic tape to a large number of slave magnetic tapes.

Figure 6:
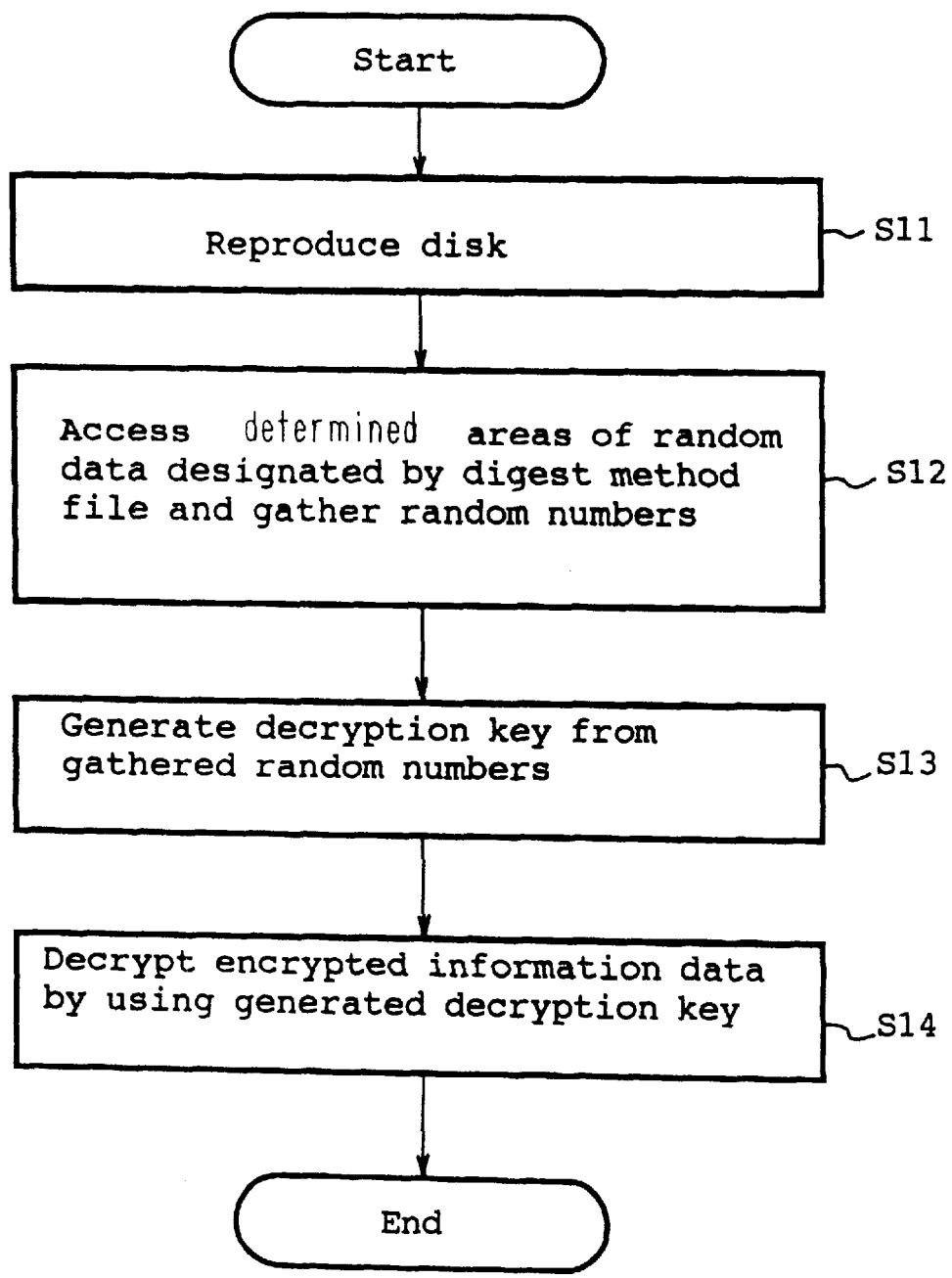
FIG. 6 is a flowchart used to explain a decrypting operation of a decrypting apparatus according to the first embodiment of the present invention.

A decrypting operation of the decrypting apparatus 14 will be described with reference to FIG. 6 which is a flowchart therefor. In step S11, the reproducing unit 16 reproduces the signals recorded on the disk 15. The reproducing unit 16 supplies the reproduced signal to the decrypting unit 17 and, when the decryption-key generating unit 18 supplies a gate signal to the reproducing unit 16, also supplies a file of the recorded signal where the random data is stored and the digest method file to the decryption-key generating unit 18.

The processing proceeds to step S12. In step S12, the decryption-key generating unit 18 extracts from the random data supplied from the reproducing unit 16 the random data designated by the digest method file, e.g., the random data from the predetermined offset to another predetermined offset in the sector of the sector number 1 and the random data from the predetermined offset to another predetermined offset in the sector of the sector number 2, and then gathers the extracted random data.

Then, the processing proceeds to step S13. In step S13, the decryption-key generating unit 18 generates the decryption key corresponding to the original encryption key from the random data gathered in step S12 and subjected to the predetermined calculation (e.g., addition) or from the random data itself. The decryption-key generating unit 18 supplies the generated decryption key to the decrypting unit 17. Then, the processing proceeds to step S14. In step S14, the decrypting unit 17 decrypts the reproduced data supplied from the reproducing unit 16, i.e., the encrypted information data (cryptogram) based on the decryption key supplied from the decryption-key generating unit 18, thus obtaining the original information data (plain text). The decrypting unit 18 outputs the original information data through the output terminal 19.

If the encrypting apparatus 1 records pit strings of the recording signal on the track of the master disk 12 in a wobbled fashion, then the inherent information generating unit 5 may generates a wobbling signal indicative of the wobbling of the pit strings of the recording signal to be recorded on the master disk 12 as the information signal inherent in the recording medium 12. If the information inherent in the disk 15 as the recording medium is a physical information to be formed on the disk 15 and a track on which the recording signal of the master disk 12 is to be recorded is a wobbled pregroove or a wobbled land portion, the wobbling signal corresponding to the pregroove or the land portion may be generated as the information signal inherent in the recording medium from the inherent information generating unit 5.

The encryption-key generating unit 4 generates an encryption key based on the wobbling signal and supplies the generated encryption key to the encrypting unit 3. The encrypting unit 3 encrypts the information data supplied from the information data generating unit 2 based on the encryption key supplied from the encryption-key generating unit 4.

In this case, the decrypting apparatus 14 is operated as follows. Specifically, the decryption-key generating unit 18 detects a wobbling frequency of the pregroove or the land portion corresponding to the predetermined portion of the recording signal on the disk 15. The decryption-key generating unit 18 generates the decryption key obtained by subjecting the data corresponding to the wobbling frequency to a predetermined calculation or generates the decryption key corresponding to the original encryption key based on the data itself corresponding to the wobbling frequency. The decryption-key generating unit 18 supplies the generated decryption key to the decrypting unit 17. The decrypting unit 17 decrypts the encrypted information data (cryptogram) supplied from the reproducing unit 16 by using the decryption key supplied from the decryption-key generating unit 18, to obtain the original information data (plain text).

As described above, if the information inherent in the recording medium is the physical information to be recorded on the recording medium, e.g., the wobbled pregroove or the wobbled land portion of the recording medium, then the recording medium may be a disk having a considerable thickness and a comparatively rigid substrate, such as a DVD, an optical disk, a magneto-optical disk, a hard disk or the like.

When the random data is employed as the information inherent in the recording medium and the position where the random data is recorded is managed by the digest method file as described above, it is possible to effect the effective copy protect in the information.

Since the normal file according to the ISO9660 standard is employed, and when the file is duplicated to the recording medium, the file is recorded on a different position of the recording medium, it is impossible to obtain the same information as that of the original disk. Therefore, it is possible to effect the more effective copy protect on the information.

Figure 7:
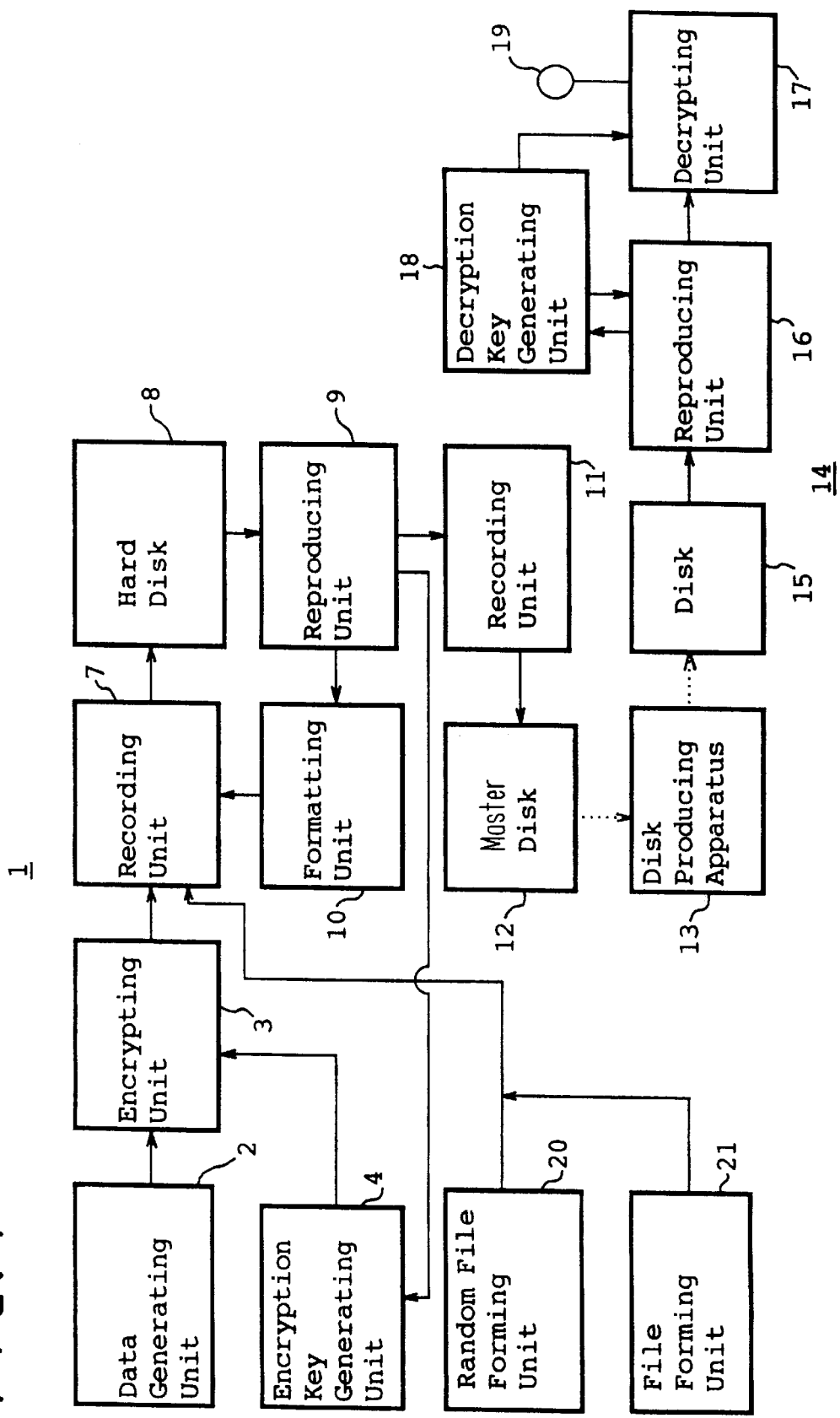
FIG. 7 is a block diagram showing an arrangement of an encrypting apparatus and a decrypting apparatus according to a second embodiment of the present invention.

FIG. 7 is a block diagram showing an arrangement of an encrypting apparatus and a decrypting apparatus, to which the encrypting and decrypting method according to the present invention is applied, according to a second embodiment of the present invention. An encrypting apparatus 1 shown in FIG. 7 has a random file forming unit 20 instead of the inherent information generating unit 5 of the encrypting apparatus 1 shown in FIG. 1 and also has a file forming unit 21 for forming a file indicative of a predetermined portion of the random file instead of the file forming unit 6 for forming a file indicative of the predetermined portion of the encrypted information. Other arrangements and operations of the encrypting and decrypting apparatus 1 and 14 shown in FIG. 7 are similar to those of the encrypting and decrypting apparatus 1, 14 shown in FIG. 1 and hence will not be described.

Figure 8:
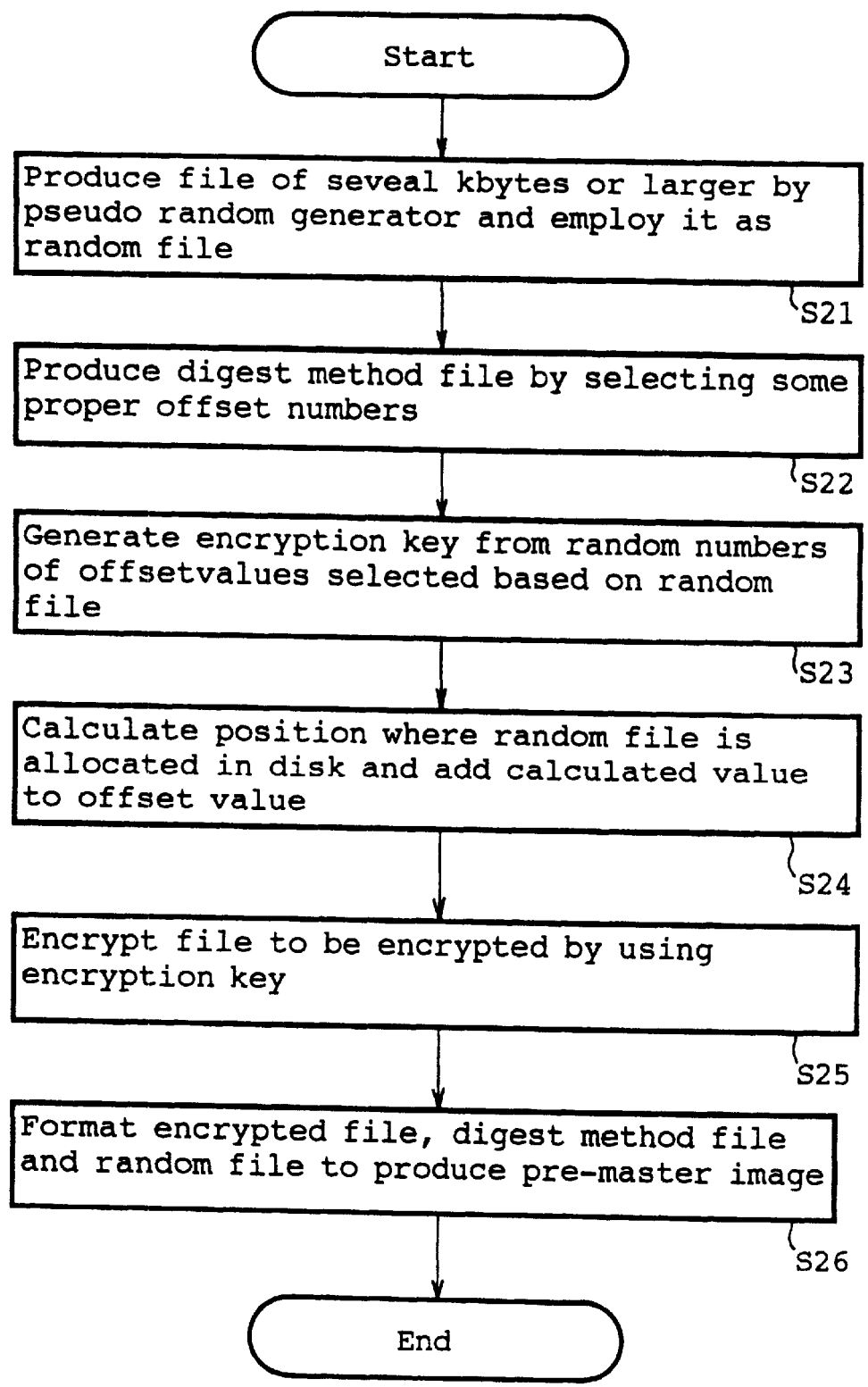
FIG. 8 is a flowchart used to explain an encrypting operation of an encrypting apparatus according to the second embodiment of the present invention.

An operation of the encrypting apparatus 1 shown in FIG. 7 will be described with reference to FIG. 8 which is a flowchart therefor. The random file forming unit 20 includes a pseudo random data generator for generating a random data. In step S21, the random file forming unit 20 produces a random file including a random data of, for example, several kbytes or larger generated by the pseudo random data generator. The random file forming unit 20 supplies the random file, for example, to the recording unit 7. The recording unit 7 records the random file on the hard disk 8.

Then, the processing proceeds to step S22. In step S22, the file forming unit 21 determines from which portions of the random file random-number data (random data) used for obtaining an inherent value (encryption key) is gathered, i.e., determines from which portions of the random data the random data from a predetermined offset number to another offset number or the random data formed of a plurality of predetermined portions is gathered. The file forming unit 21 forms a digest method file indicative of the predetermined portions of these random data and supplies the digest method file to the recording unit 7. The recording unit 7 once records the digest method file on the hard disk 8. Finally, the reproducing unit 9 reads out the recorded digest method file from the hard disk 8 and supplies the reproduced digest method file to the recording unit 11, and the recording unit 11 records the digest method file on the master disk 12.

Then, the processing proceeds to step S23. In step S23, the reproducing unit 9 gathers the random data, recorded on the hard disk 8, of the one predetermined portion from the predetermined offset address to another predetermined offset address or the random data, recorded on the hard disk 8, of a plurality of predetermined portions, and reproduces them. The reproducing unit 9 supplies the reproduced random data to the encryption-key generating unit 4. The encryption-key generating unit 4 generates the encryption key (inherent value) (disk digest) from the random data itself or the random data subjected to the predetermined calculation.

Then, the processing proceeds to step S24. In step S24, the position where the random file is allocated in the master disk 12 is calculated, i.e., there is calculated an offset value (offset number) of a predetermined sector number obtained when the random file is inserted into the encrypted information data recorded on the hard disk 8 and then recorded on the master disk 12. The calculated offset value is added to the offset number (offset value) designated by the digest method file. Thus, the digest method file is modified.

Then, the processing proceeds to step S25. In step S25, the encryption-key generating unit 4 supplies the generated encryption key (the inherent value) (disk digest) to the encrypting unit 3. The encrypting unit 3 encrypts the information data supplied from the information data generating unit 2 and supplies the encrypted information data to the recording unit 7. The recording unit 7 records the encrypted information data on the hard disk 8.

Then, the processing proceeds to step S26. In step S26, the reproducing unit 9 reproduces the encrypted information data, the signal indicative of the information inherent in the recording medium, and the digest method file indicative of the predetermined encrypted portion from the hard disk 8 and supplies them to the formatting unit 10. The formatting unit 10 formats the information data, the information signal and the digest method file to produce the pre-master image. In this formatting operation, as described above, the formatting unit 10 can format the random file as the interleaved file or the multi extent file to disperse the random file to the different positions.

The formatting unit 10 supplies the pre-master image to the recording unit 7. The recording unit 7 once records the pre-master image on the hard disk 8. The reproducing unit 9 reproduces the pre-master image recorded on the hard disk 8 and supplies the reproduced pre-master image to the recording unit 11. The recording unit 11 records on the master disk 12 the pre-master image supplied from the reproducing unit 9 or the pre-master image supplied directly from the formatting unit 10.

The disk producing apparatus 13 employs the master disk 12 as the original disk to obtain a large number of the disks (slave disks) 15 by duplication of the master disk 12.

A decrypting operation of the decrypting apparatus 14 shown in FIG. 7 will be described with reference to FIG. 9 which is a flowchart therefor. In step S31, the reproducing unit 16 reproduces the disk 15 and supplies the reproduced data to the decryption-key generating unit 18. Then, the processing proceeds to step S32. In step S32, the decryption-key generating unit 18 extracts from the reproduced encrypted information data the random data, designated by the digest method file, of a portion from the predetermined offset to another predetermined offset in the sector of the predetermined sector number and of another portion from the predetermined offset to another predetermined offset. The decryption-key generating unit 18 gathers them.

Then, the processing proceeds to step S33. In step S33, the decryption-key generating unit 18 generates the decryption key obtained by subjecting the random data to the predetermined calculation or the decryption key corresponding to the original encryption key based on the random data itself and then supplies the generated decryption key to the decrypting unit 17. Then, the processing proceeds to step S34. In step S34, the decrypting unit 17 decrypts the encrypted information data (cryptogram) supplied from the reproducing unit 16 by using the decryption key supplied from the decryption key supplied from the decryption-key generating unit 18 to obtain the original information data (plain text). The decrypting unit 17 outputs the original information data through the output terminal 19.

Figure 10:
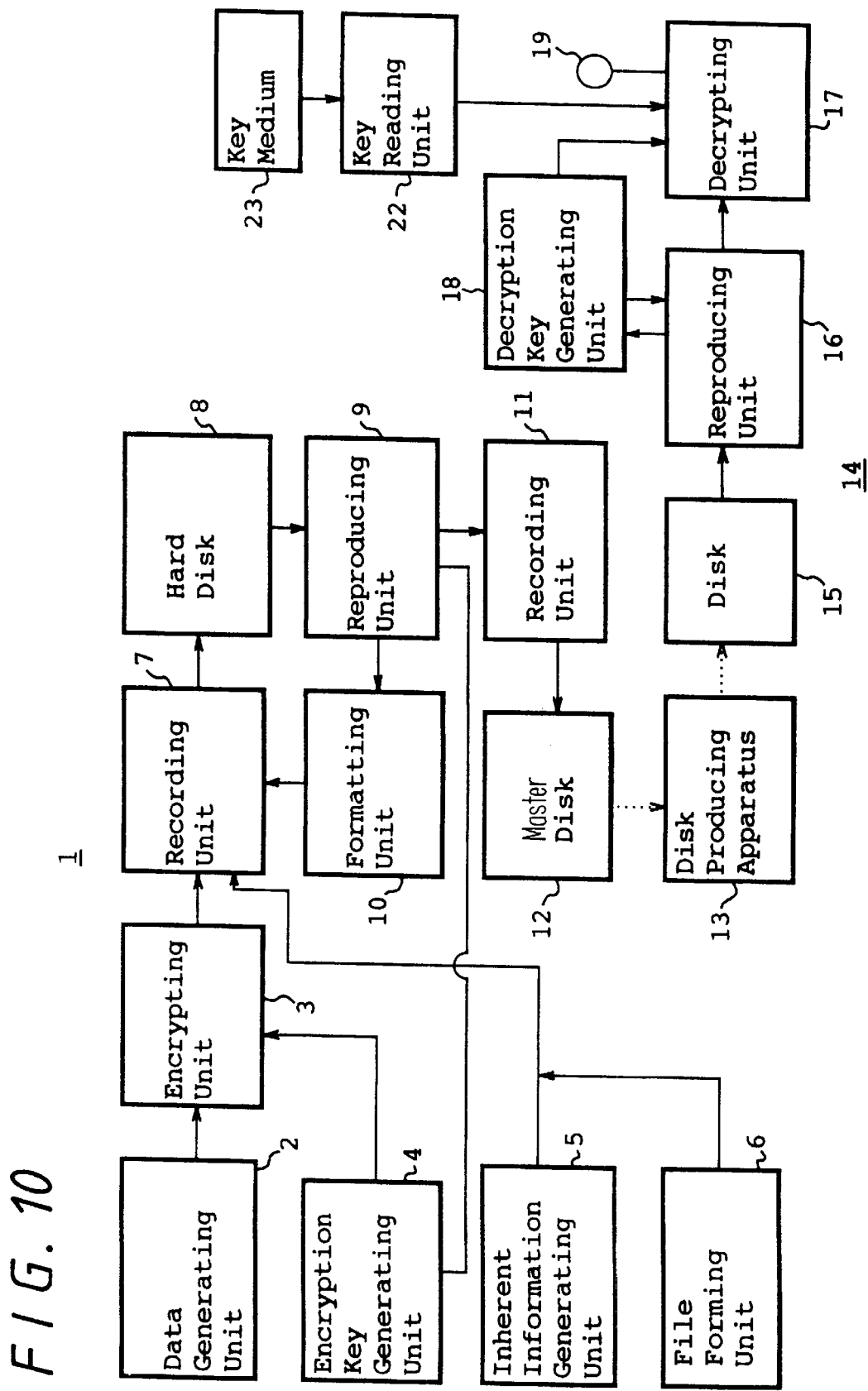
FIG. 10 is a block diagram showing an arrangement of an encrypting apparatus and a decrypting apparatus according to a third embodiment of the present invention.

FIG. 10 is a block diagram showing arrangements of an encrypting apparatus and a decrypting apparatus according to a third embodiment of the present invention. An arrangement of the encrypting apparatus 1 shown in FIG. 10 is basically similar to the encrypting apparatus shown in FIG. 1 and hence will not be described.

Figure 11:
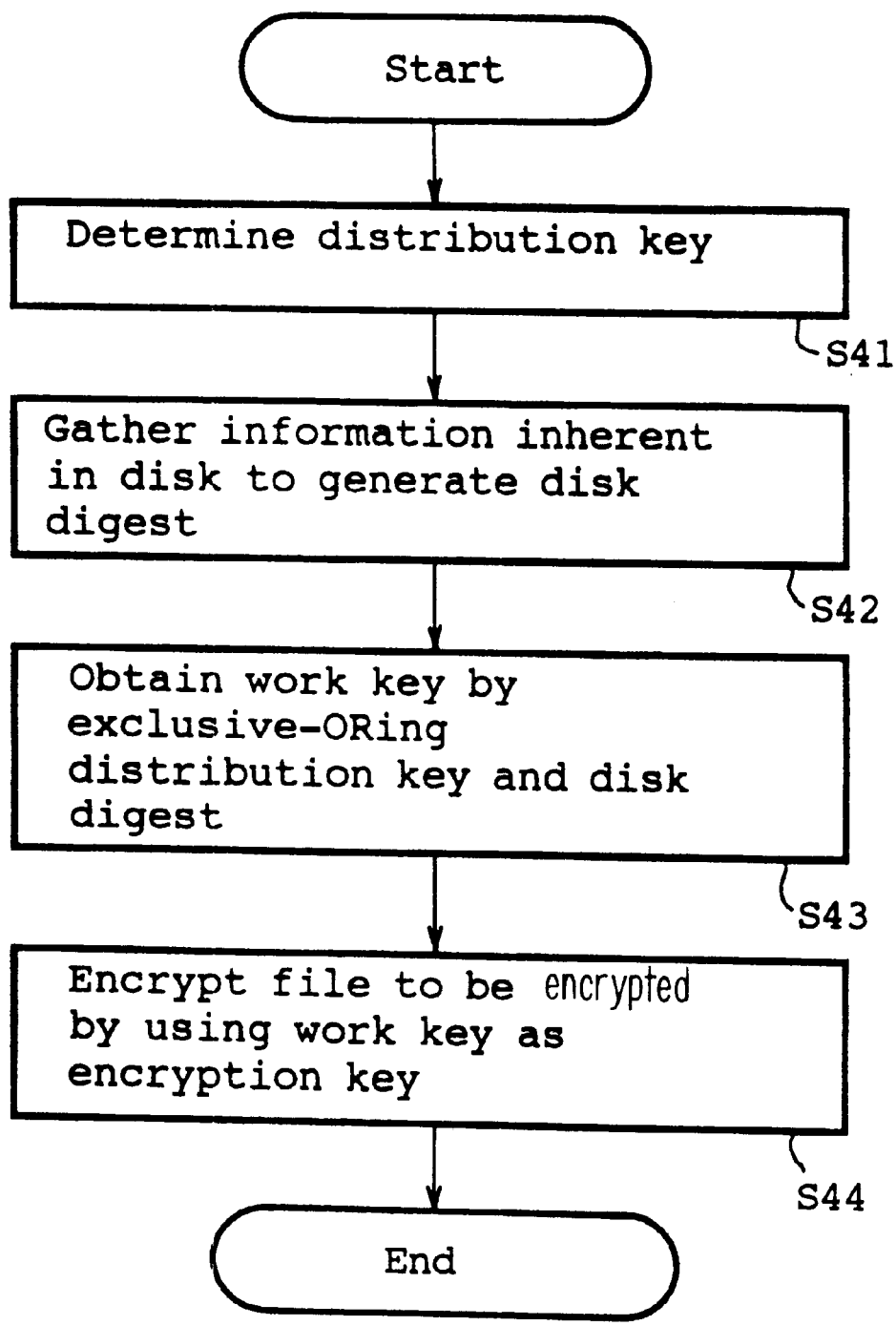
FIG. 11 is a flowchart used to explain an encrypting operation of an encrypting apparatus according to the third embodiment of the present invention.

An encryption method employed by the encrypting apparatus 1 shown in FIG. 10 will be described with reference to FIG. 11 which is a flowchart therefor. In step S41, a distribution key (distribution-key data) to be distributed to a user is properly determined and registered in a memory (e.g., a semiconductor memory) in the encryption-key generating unit 4. The distribution key may be registered in a central processing unit (CPU) (which may include the memory) instead of the memory.

Then, the processing proceeds to step S42. In step S42, similarly to the processing described above with reference to the flowchart of FIG. 3, the encryption-key generating unit 4 gathers the informations inherent in the disk 15 and subjects the informations to a predetermined calculation to generate the disk digest (key). Then, the processing proceeds to step S43. In step S43, the encryption-key generating unit 4 subjects the distribution key determined in step S41 and the disk digest generated in step S42 to a predetermined calculation, e.g., exclusive-ORs the distribution key and the disk digest and sets the calculated result as a work key.

The processing proceeds to step S44. In step S44, the encryption-key generating unit 4 supplies the work key obtained through the calculation in step S43 to the encrypting unit 3 as the encryption key. The encrypting unit 3 encrypts the information data based on the encryption key and supplies the encrypted information data to the recording unit 7. The recording unit 7 records the encrypted information data on the hard disk 8.

The decrypting apparatus 14 shown in FIG. 10 has a key reading unit 22 and a key medium 23 newly provided in addition to those of the decrypting apparatus 14 shown in FIG. 1. The key medium 23 is arranged such that the above-mentioned distribution key can be distributed. For example, the distribution key may be printed on some suitable object in the form of Arabic numerals, symbols, bar codes, other codes similar to the bar codes or the like. The key medium 23 can be formed of a card or the disk 15 itself.

The key medium 23 may includes a memory, such as a semiconductor memory or the like, storing the distribution key or a CPU or the like including the memory. The key medium 23 including the memory or the CPU may be formed of a card (e.g., an integrated circuit (IC) card) or the like. The key medium 23 may be arranged such that the distribution key is recorded thereon magnetically or optically. Such key medium 23 is to be sold on a market solely or together with a reproducing apparatus for reproducing the disk 15. The key reading unit 22 reads out the distribution key printed on or recorded on the key medium 23.

Figure 12:
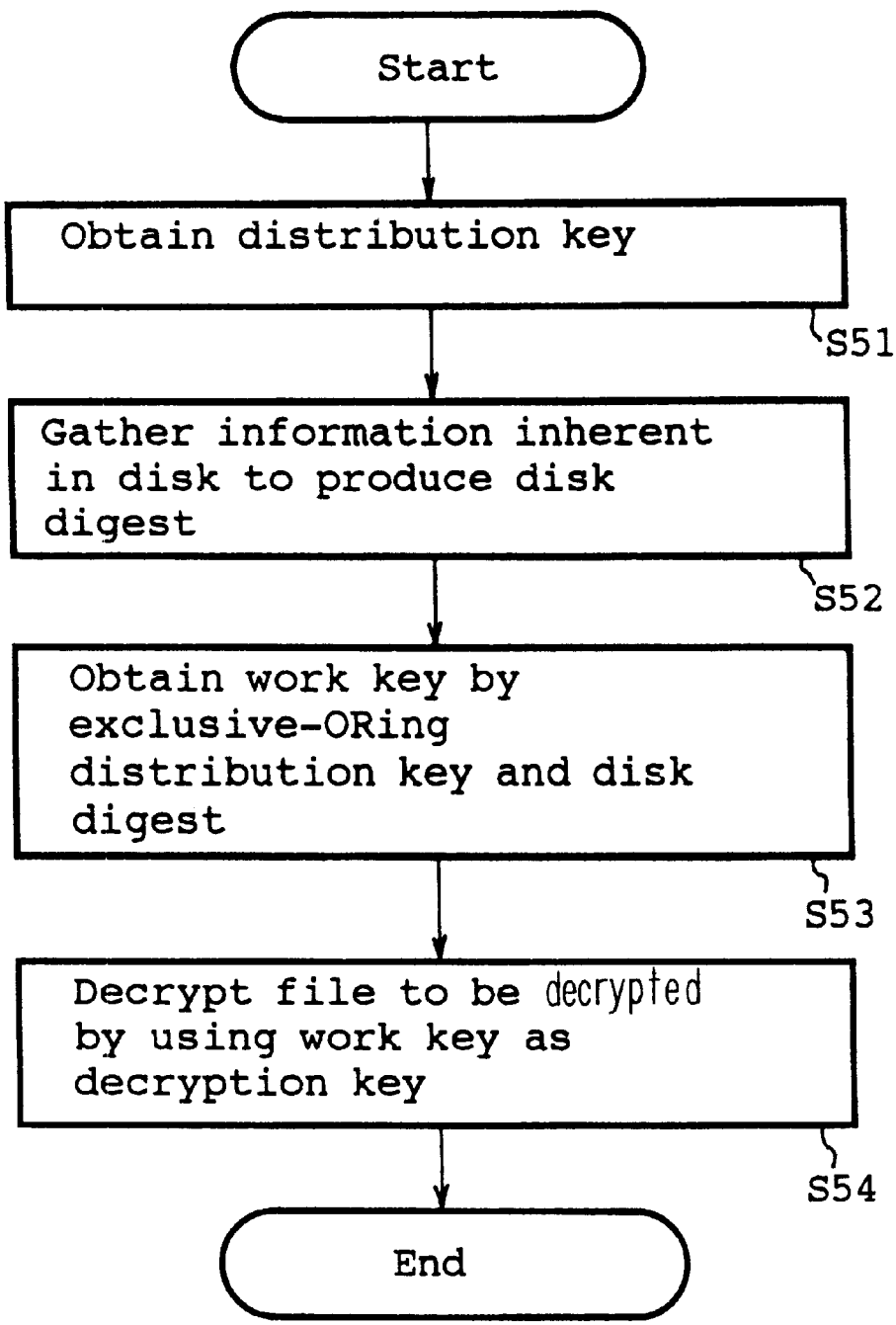
FIG. 12 is a flowchart used to explain a decrypting operation of a decrypting apparatus according to the third embodiment of the present invention.

A decrypting operation of the decrypting apparatus 14 shown in FIG. 10 will be described with reference to FIG. 12 which is a flowchart therefor. In step S51, the key reading unit 22 reads out the distribution key printed on or recorded on the key medium 23 and supplies the distribution key to the decryption-key generating unit 18. Then, the processing proceeds to step S52. In step S52, similarly to the processing decryption processing described with reference to FIG. 6, the decryption-key generating unit 18 gathers the informations inherent in the disk 15 and subjects the informations to a predetermined calculation, thereby obtaining the disk digest (key) corresponding to the original disk digest (key).

Then, the processing proceeds to step S53. In step S53, the decryption-key generating unit 18 subjects the distribution key obtained in step S51 and the disk digest obtained in step S52 to a predetermined calculation, e.g., exclusive-ORs the distribution key and the disk digest, thereby obtaining the work key. Then, the processing proceeds to step S54. In step S54, the decryption-key generating unit 18 supplies the work key obtained in step S53 as the decryption key to the decrypting unit 17. The decrypting key 17 decrypts the encrypted information data supplied from the reproducing unit 16 by using the decryption key supplied from the decryption-key generating unit 18 and then outputs the decrypted information data through the output terminal 19.

Figure 13:
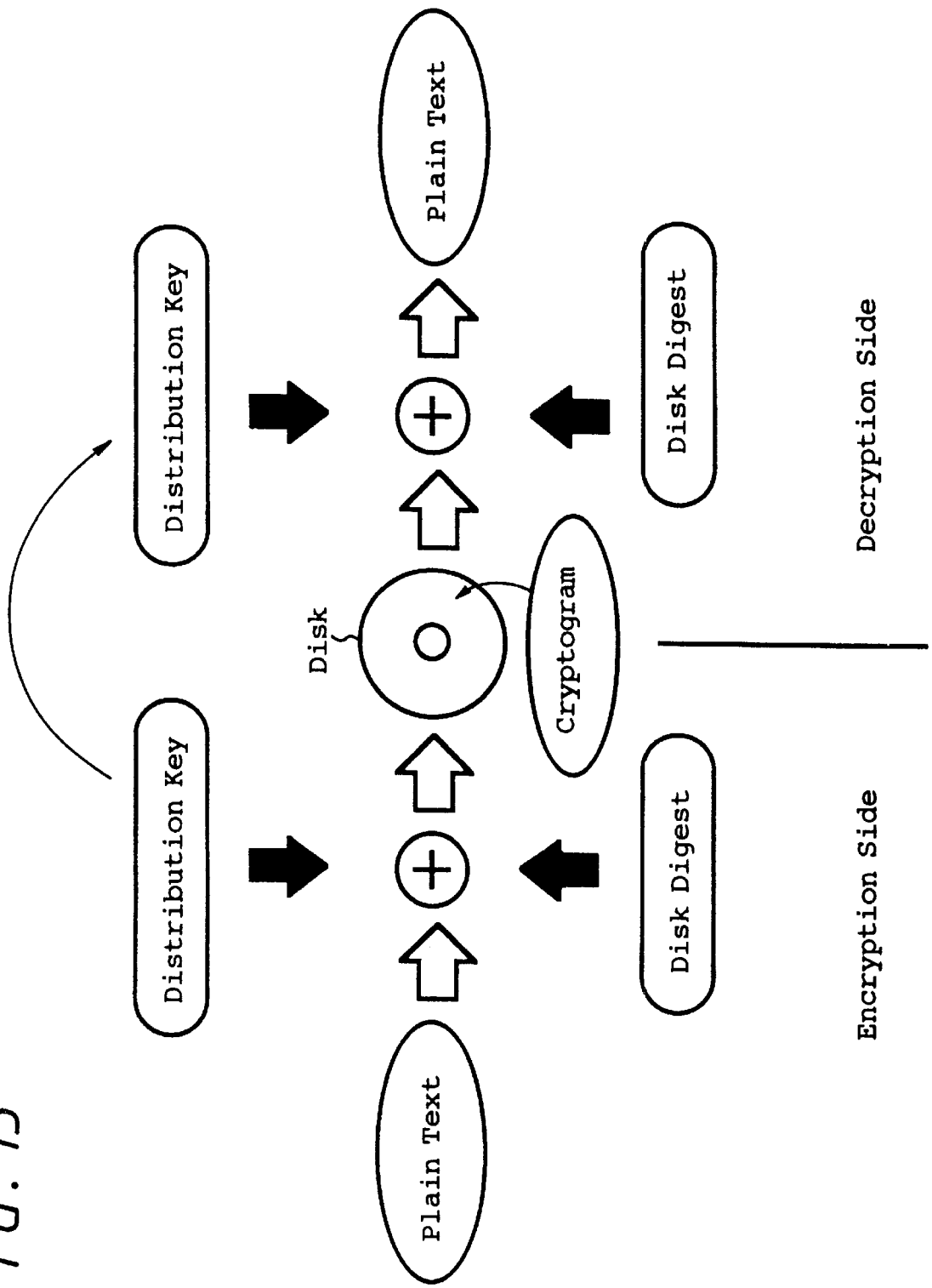
FIG. 13 is a diagram used to explain encrypting and decrypting methods employed by the encrypting and decrypting apparatus according to the third embodiment.

FIG. 13 is a diagram used to explain the encryption method and the description method respectively employed in the encrypting apparatus 1 and the decrypting apparatus 14 shown in FIG. 10. Specifically, the plain text is encrypted based on the distribution key and the disk digest, and the cryptogram obtained by encryption of the plain text is recorded on the disk. The distribution key is supplied to a user through a route other than the disk. The cryptogram read out from the disk is decrypted based on the disk digest obtained by calculation of the distribution key and the data read out from predetermined one or plural areas of the disk. Thus, the decrypted plain text is output.

Figure 14:
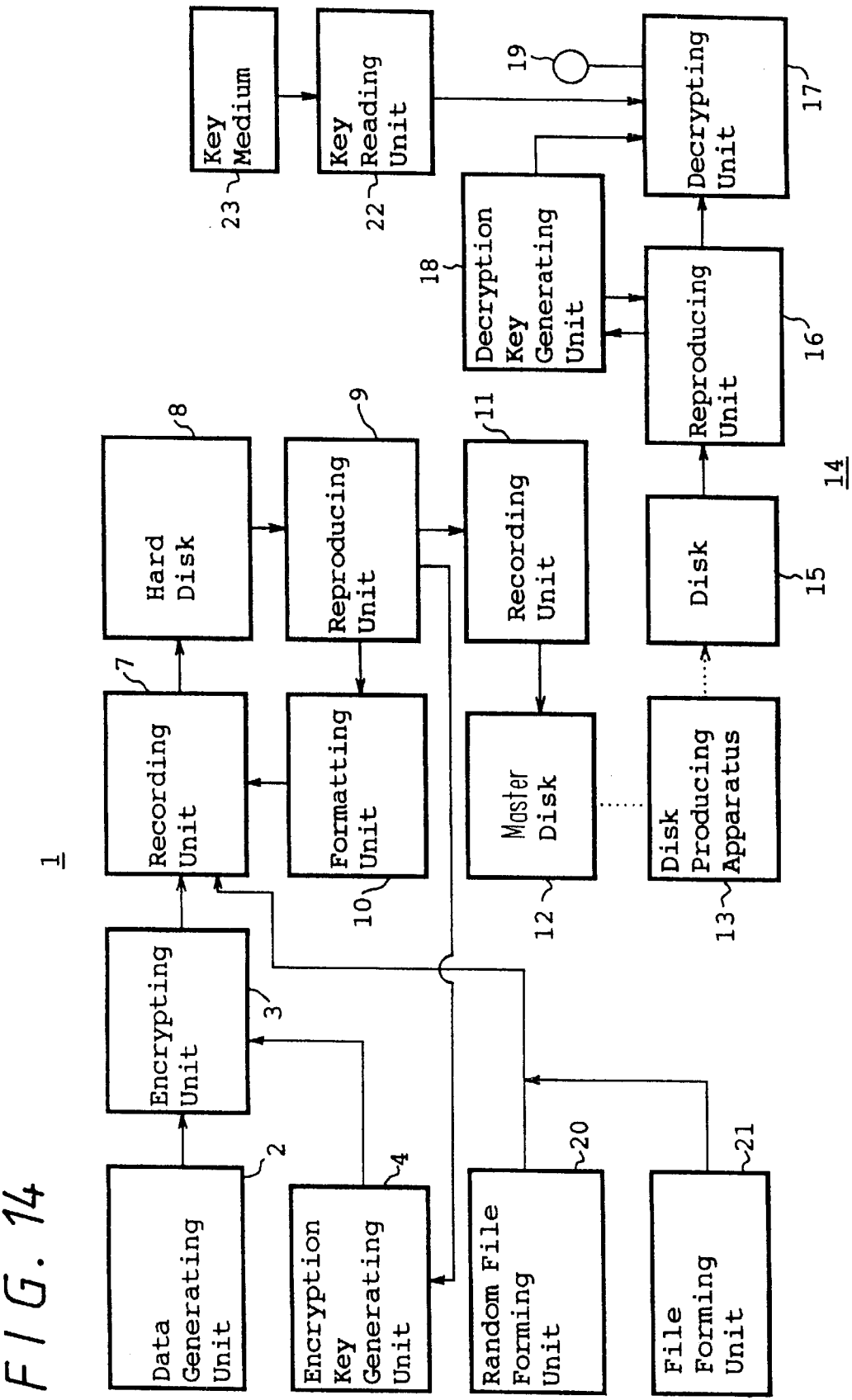
FIG. 14 is a block diagram showing an arrangement of an encrypting apparatus and a decrypting apparatus according to a fourth embodiment of the present invention.

FIG. 14 is a block diagram showing an encrypting apparatus and a decrypting apparatus according to a fourth embodiment of the present invention.

An encrypting apparatus 1 shown in FIG. 14 has a random file forming unit 20 and a random file forming unit 21 for forming a file indicative of a predetermined portion of the random file both similar to those shown in FIG. 7 instead of the inherent information generating unit 5 and the file forming unit 6 of the encrypting apparatus 1 shown in FIG. 10. The random file forming unit 20 and the file forming unit 21 are operated basically similarly to those described with reference to FIG. 7 and other units are also operated basically similarly to the those described with reference to FIG. 10. Therefore, the operations of the encrypting apparatus 1 and the decrypting apparatus 14 shown in FIG. 14 will not be described. The encrypting apparatus 1 and the decrypting apparatus 14 having such arrangements can carry out the operations of encrypting the plain text and decrypting the cryptogam obtained by encryption of the plain text by the method shown in FIG. 13.

Even if any of the encrypting apparatus 1 according to the first to fourth embodiments is employed to read the information data (file) from the predetermined recording medium (the disk 15 in this case) and to dub (or copy) the information data on another predetermined medium, then it is impossible to obtain the same data as recorded on the original recording medium from another recording medium because the information data is usually recorded on another recording medium at the positions different from those where the information data is recorded on the original recording medium. Therefore, it is impossible to decrypt the encrypted information data. Alternatively, even if the information data recorded on another recording medium can be decrypted, it is impossible to output the decrypted information data through the output terminal as the digital signals. As a result, employment of the encrypting apparatus and method makes it difficult to copy the information data to another recording medium.

Since the random file is arranged as the interleaved file or the multi extent file and hence recorded on the different and dispersed positions of the recording medium, as described above, it becomes more difficult to match the positions of the random data recorded on the read-only disk with the positions of the random data copied on the hard disk from the read-only disk. Therefore, the illegitimate dubbing (copying) can be suppressed.

Figure 15:
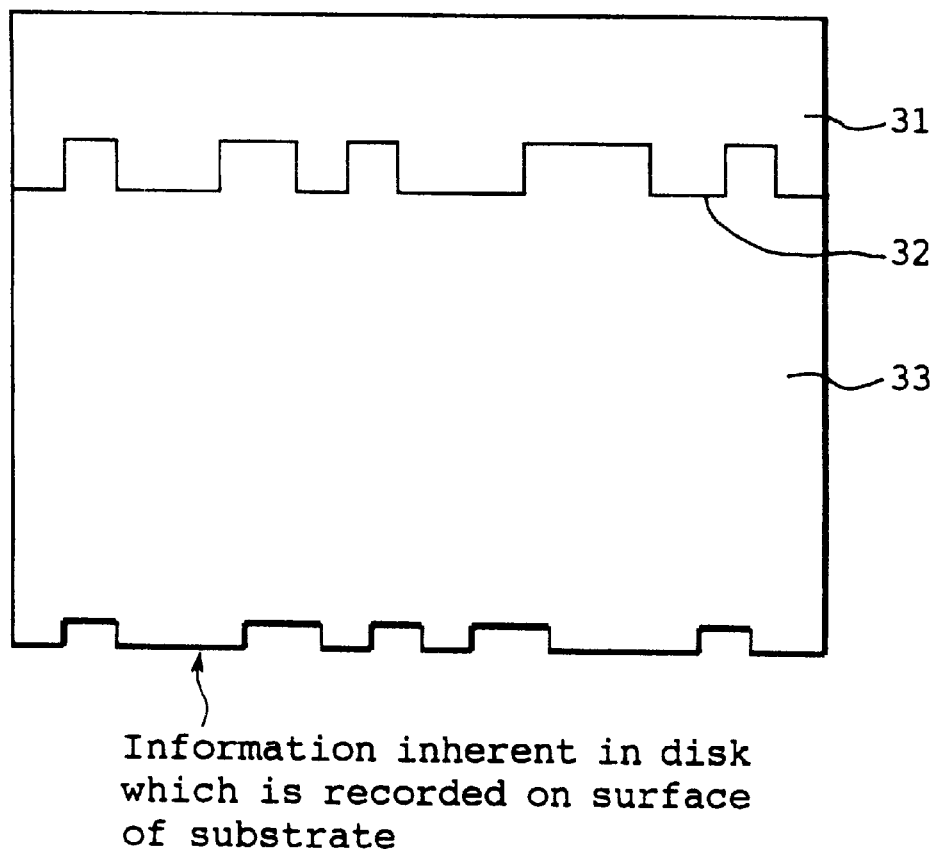
FIG. 15 is a cross-sectional view showing a disk having an inherent information recorded on its surface.

In each of the first to fourth embodiments, as shown in FIG. 15, the information inherent in the disk 15 can be recorded by ultraviolet laser or the like on a disk surface, i.e., a surface of the disk substrate 33.

When the information inherent in the disk which is recorded on the surface of the disk substrate 33 is read out, rays of light must be condensed on the surface of the disk substrate 33 by moving an optical head (not shown) in the direction perpendicular to the disk surface ,and further a special reading apparatus and a special reading command (e.g., a command to move the optical head in the direction perpendicular to the disk surface) are required. Therefore, it becomes difficult to read the information thus recorded, and it becomes impossible to easily copy such information.

This arrangement can also be effective in protecting the information from an optical copy or a so-called "peel and copy". The "peel and copy" is to physically copy pits 32 formed on the disk substrate 33 after a protective film 31 is peeled off from the disk substrate 33. Specifically, the information inherent in the disk is recorded or printed on the disk substrate 33, it is possible to protect the information inherent in the disk from the "peel and copy" and the optical copy in which rays of light are irradiated on the pits 32 of the disk substrate 33 and the copy is carried out based on the reflected light or the transmission light.

The apparatus and methods according to the first to fourth embodiments of the present invention can be utilized for communication such as wire communication (e.g., communication through an electric cable, an optical fiber cable or the like), wireless communication (communication utilizing electric waves, light, sound waves or the like), or the like. In this case, the encrypting apparatus 1 supplies the cryptogram to the decrypting apparatus 14 through the wire communication or the wireless communication.

While the file is formatted in accordance with the ISO9660 standard in the first to fourth embodiment, the present invention is not limited thereto. While the work key is generated by calculating the distribution key and the disk digest in the first to fourth embodiments, the present invention is not limited thereto. The work key may be generated by calculating the distribution key and the wobbling signal.

According to the encrypting apparatus and method of the present invention, since the information inherent in the recording medium is set as the frequency of the predetermined portion of the wobbled pregroove or the wobbled land portion to be formed on the recording medium, it is possible to effect the strong copy protect on the information.

According to the encrypting apparatus and method of the present invention, since the information inherent in the recording medium is set as the random data to be inserted into the predetermined portion of the encrypted information to be recorded on the recording medium, dispersion of the random-data insertion positions can make it difficult to read the random data and it is possible to effect the strong copy protect on the information.

According to the encrypting method of the present invention, since the third encryption key is generated from the first key generated from the information inherent in the recording medium and the second key independent of the first key and the information to be recorded on the recording medium is encrypted by using the third key, it is possible to simplify the arrangement of the encrypting apparatus and it is possible to effect the strong copy protect on the information.

According to the decrypting apparatus and method of the present invention, the encryption key is generated based on the random data to be inserted into the predetermined portion of the encrypted information to be recorded on the recording medium. By using the encryption key, the first file and the second file are respectively reproduced from the first file where the encrypted information is stored and the recording medium where the second file in which there is recorded the data indicative of the predetermined portion of the random data to be inserted into the predetermined portion of the encrypted information. Based on the data stored in the reproduced second file and indicating predetermined portion of the random data, the random data is detected from the encrypted information stored in the first file. The decryption key is generated from the detected random data. The encrypted information of the reproduced first file is decrypted by using the decryption key. Therefore, it is possible to decrypt the information protected by the strong copy protect.

According to the decrypting method of the present invention, the encryption key is generated based on the wobbling frequency of the predetermined portion of the encrypted information to be recorded on the recording medium. By using the encryption key, the first file and the second file are respectively reproduced from the first file where the encrypted information is stored and the recording medium where the second file in which there is recorded the data indicative of the predetermined portion of the predetermined portion of the encrypted information to be recorded on the recording medium. Based on the data stored in the reproduced second file and indicating a predetermined portion of the encrypted information, the wobbling frequency of the predetermined portion of the encrypted information is detected. The decryption key is generated based on the detected wobbling frequency. The encrypted information of the reproduced first file is decrypted by using the decryption key. Therefore, it is possible to decrypt the information protected by the strong copy protect.

According to the decrypting method of the present invention, the encryption key is generated based on the frequency of the predetermined portion of the wobbled pregroove or the wobbled land portion to be formed on the recording medium. By using the encryption key, the first file and the second file are respectively reproduced from the first file where the encrypted information is stored and the recording medium where the second file in which there is recorded the data indicative of the predetermined portion of the wobbled pregroove or the wobble land portion to be formed on the recording medium. Based on the data stored in the reproduced second file and indicating predetermined portion of the wobbled pregroove or the wobbled land portion, the wobbling frequency of the predetermined portion of the pregroove or the land portion formed on the recording medium is detected. The decryption key is generated based on the detected wobbling frequency. The encrypted information of the reproduced first file is decrypted by using the decryption key. Therefore, it is possible to decrypt the information protected by the strong copy protect.

According to the decrypting method of the present invention, the encryption key is generated based on the random data selected from the predetermined portions of the random file formed of the random data generated by the predetermined pseudo random data generator. The file storing the information encrypted by using the encryption key, the file storing the data indicative of the predetermined portion of the random file formed of the random data and the random file are reproduced. Based on the file storing the data indicative of the predetermined portion of the reproduced random file, the decryption key is generated from the random data at the portions of the random file. By using the decryption key, the encryption information reproduced from the recording medium is decrypted. It is possible to decrypt the information protected by the strong copy protect.

According to the decrypting method of the present invention, by using the third key generated from the first encryption key generated from the information inherent in the recording medium and the second key independent of the first encryption key, the information is encrypted. The first decryption key is generated from the information inherent in the recording medium where the encrypted information is recorded. The third decryption key is generated based on the first decryption key and the second decryption key recorded on the predetermined key medium and corresponding to the second encryption key. By using the third decryption key, the information encrypted by using the third encryption key and reproduced from the recording medium is decrypted. It is possible to decrypt the information protected by the strong copy protect.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A method of encrypting information to generate encrypted data and recording the encrypted data onto a recording medium, comprising the steps of:

generating an encryption key based on key data which is determined from said recording medium yet is not part of said encrypted data, wherein said key data includes the wobbling frequency of a wobbled pre-groove and/or wobbled land portion of said recording medium; and encrypting the information based on said encryption key.

2. The method according to claim 1, further comprising the steps of generating a file indicative of one or more positions on said recording medium and recording said file on said recording medium; wherein the frequency of at least one wobbled pre-groove and/or at least one wobbled land portion located at said positions is used as said key data.

3. An apparatus for encrypting information to generate encrypted data and recording the encrypted data onto a recording medium, comprising:

means for generating an encryption key based on key data which is determined from said recording medium yet is not part of said encrypted data, wherein said key data includes the wobbling frequency of a wobbled pre-groove and/or wobbled land portion of said recording medium; and means for encrypting the information based on said encryption key.

4. The apparatus according to claim 3, further comprising means for generating a file indicative of one or more positions on said recording medium and recording said file on said recording medium; wherein the frequency of at least one wobbled pre-groove and/or at least one wobbled land portion located at said positions is used as said key data.

5. A method of decrypting encrypted data that has been recorded on a recording medium, comprising the steps of:

reproducing a first file from said recording medium, said first file containing said encrypted data, wherein said encrypted data has been encrypted by an encryption key and said encryption key is based on the wobbling frequency of a wobbled pre-groove and/or wobbled land portion of said recording medium;

reproducing a second file containing data indicative of one or more positions on said recording medium;

detecting the wobbling frequency of a wobbled pre-groove and/or wobbled land portion of said recording medium at each said position indicated by said second file;

generating a decryption key based on said detected wobbling frequencies; and decrypting said encrypted data of said reproduced first file by using said decryption key.

6. A decrypting apparatus for decrypting an encrypted information recorded on a recording medium, comprising:

a means for reproducing from a recording medium a first file storing information encrypted by using an encryption key generated based on a wobbling frequency of a predetermined portion of said information to be recorded on a recording medium and a second file storing data indicative of a predetermined portion of said encrypted information to be recorded on said recording medium;

a means for detecting said wobbling frequency of a predetermined portion of said information stored in said reproduced first file based on said data stored in said reproduced second file and indicating said predetermined portion of said encrypted information;

a means for generating a decryption key from said detected wobbling frequency; and a means for decrypting said encrypted information of said reproduced first file by using said decryption key.

7. A method of encrypting information to generate encrypted data and recording the encrypted data onto a recording medium, comprising the steps of:

generating a first encryption key based on key data which is determined from said recording medium yet is not part of said encrypted data;

generating a second encryption key based on said first encryption key and a third encryption key, which is independent of said first encryption key; and encrypting the information based on said second encryption key.

8. The method according to claim 7, wherein said key data includes the wobbling frequency of a wobbled pre-groove and/or wobbled land portion of said recording medium.

9. The method according to claim 7, wherein said key data is random data which has been inserted in-between said encrypted data at predetermined positions.

10. An apparatus for encrypting information to generate encrypted data and recording the encrypted data onto a recording medium, comprising:

means for generating a first encryption key based on key data which is determined from said recording medium yet is not part of said encrypted data;

means for generating a second encryption key based on said first encryption key and a third encryption key, which is independent of said first encryption key; and means for encrypting the information based on said second encryption key.

11. The apparatus according to claim 10, wherein said key data includes the wobbling frequency of a wobbled pre-groove and/or wobbled land portion of said recording medium.

12. The apparatus according to claim 10, wherein said key data is random data which has been inserted in-between said encrypted data at predetermined positions.

13. A method of decrypting encrypted data that has been recorded on a recording medium, comprising the steps of:

generating a first decryption key based on key data which is determined from said recording medium yet is not part of said encrypted data, wherein said key data has been used to generate a first encryption key, said first encryption key has been used to generate a second encryption key, and said encrypted data has been encrypted using said second encryption key and a third encryption key, said third encryption key being reproduced from a key medium and being independent of said first encryption key;

generating a second decryption key based on said first decryption key and a third decryption key, which is independent of said first decryption key; and decrypting said encrypted data by using said second decryption key.

14. The method according to claim 13, wherein said key medium whereon said third decryption key is magnetically or optically recorded.

15. The method according to claim 13, wherein said key medium comprises a memory having said third decryption key stored therein.

16. An apparatus for decrypting encrypted data that has been recorded on a recording medium, comprising:

means for generating a first decryption key based on key data which is determined from said recording medium yet is not part of said encrypted data, wherein said key data has been used to generate a first encryption key, said first encryption key has been used to generate a second encryption key, and said encrypted data has been encrypted using said second encryption key and a third encryption key, said third encryption key being reproduced from a key medium and being independent of said first encryption key;

means for generating a second decryption key based on said first decryption key and a third decryption key, which is independent of said first decryption key; and means for decrypting said encrypted data by using said second decryption key.

17. The apparatus according to claim 16, wherein said key medium whereon said third decryption key is magnetically or optically recorded.

18. The apparatus according to claim 16, wherein said key medium comprises a memory having said third decryption key stored therein.

19. A method of recording information on a recording medium, comprising the steps of:

receiving said information in the form of encrypted data which represents said information, said encrypted data being generated by using a second encryption key and a third encryption key, wherein said second encryption key is generated from a first encryption key and said first encryption key is based on key data which is determined from said recording medium yet is not part of said encrypted data, and wherein said third encryption key is independent of said first encryption key; and recording said received encrypted data on said recording medium.

* * * * *